J. BINGHAM.
METHOD OF ASSEMBLING ROLL HOLDING CAGES.
APPLICATION FILED SEPT. 28, 1917.
1,387,830.
Patented Aug. 16, 1921.
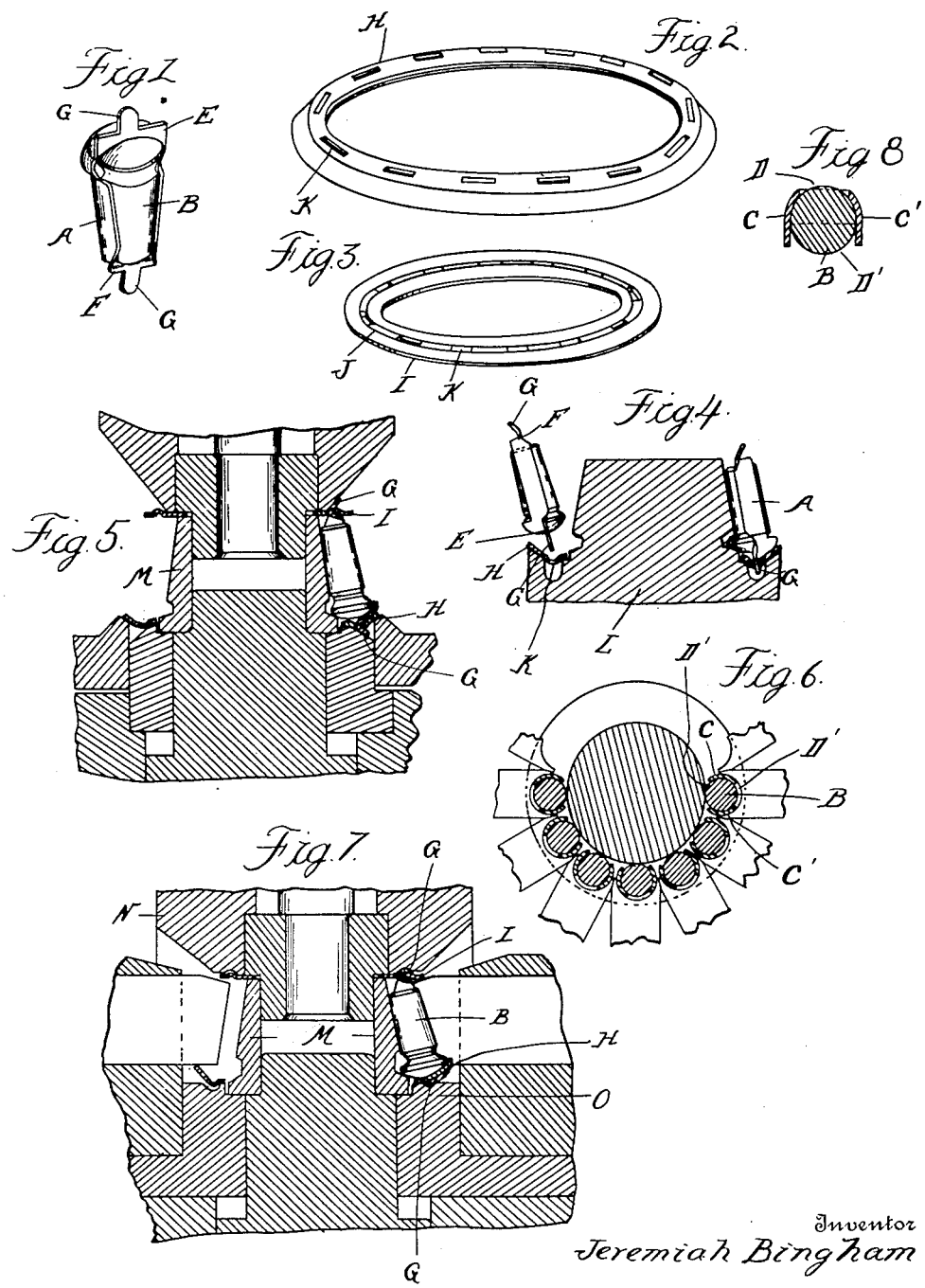
Inventor
Jeremiah Bingham
By Whittemore Hulbert & Whittemore
Attorneys

UNITED STATES PATENT OFFICE.

JEREMIAH BINGHAM, OF TOLEDO, OHIO, ASSIGNOR TO THE BOCK BEARING COMPANY, OF TOLEDO, OHIO, A CORPORATION OF OHIO.

METHOD OF ASSEMBLING ROLL-HOLDING CAGES.

1,387,830.      Specification of Letters Patent.    Patented Aug. 16, 1921.

Application filed September 28, 1917. Serial No. 193,718.

*To all whom it may concern:*

Be it known that I, JEREMIAH BINGHAM, a citizen of the United States of America, residing at Toledo, in the county of Lucas and State of Ohio, have invented certain new and useful Improvements in Methods of Assembling Roll-Holding Cages, of which the following is a specification, reference being had therein to the accompanying drawings.

The invention relates to roller bearings of that type in which the rollers are housed in individual cells, which cells are connected to each other to maintain the same in predetermined relation. The invention has more particular reference to the method of assembling the individually-formed cells and accurately alining the same. Such alinement is absolutely essential to the proper operation of the bearing, as a very slight inaccuracy will cause wear and bad results. I have therefore devised a method, comprising essentially, first, alining the individual cells, and second, rigidly connecting said cells while thus alined.

In the drawings:

Figures 1, 2 and 3 are perspective views showing respectively one of the roll-holding cells and the connector rings therefor;

Fig. 4 illustrates the first step in assembling the individual cells with the connectors;

Fig. 5 is a succeeding step in the operation;

Fig. 6 is a sectional plan view showing the manner of placing the rolls in true alinement;

Fig. 7 shows the final closing operation for imparting permanent rigidity to the alined assembly;

Fig. 8 is a cross section showing the manner of engagement of the roll with the housing.

The individual cells or roll-holding units A which are employed in forming the cage are preferably formed of pressed sheet-metal recessed to receive the rolls B and having segments C and C' upon diametrically opposite sides of the roll, with cut-away segments D and D' for exposing the bearing portions of the rolls. The ends of the housings A are provided with projecting flanges E and F and with centrally projecting tongues G. H and I are the connector rings, which are formed preferably of sheet-metal and of a channel cross-section so as to impart rigidity thereto. Each of these rings is grooved at J to receive the flanges at the ends of the roll housings and to hold the same from rotation, and apertures K are provided at intervals for the engagement of the tongues G, by which the cells or housings are secured to the connectors. In assembling the bearing the rolls are first closed within the housings A by suitable means (not shown), and these housed rolls are then assembled with the connector rings. As shown in Fig. 4, the large ring H is placed in a suitable jig surrounding a conical bearing L, and the cells are successively placed around the bearing L with the tongues G inserted through the apertures K in the ring. When the series is complete the small ring I is placed in engagement with the tongues at the upper ends of the cells and these tongues are then bent by suitable means, such as shown in Fig. 5, to partly clench the same and prevent detachment. If, instead of this operation, the tongues were completely clenched there would be great danger of misalinement of the rolls. This misalinement might be so slight as to be unnoticeable, but in the operation of the bearing would greatly interfere with the efficiency and life thereof. It is therefore essential that the rolls should be alined with great accuracy before clenching of the tongues, which is preferably accomplished as shown in Figs. 6 and 7. As indicated, the cage is placed around a central conical bearing M, and keeper jaws N are then engaged with the individual roll cells and moved radially inward so as to force the rolls into true alinement. While thus engaged, upper and lower dies N and O are forced oppositely against the rings I and H, and the pressure is sufficient, first, to force the flanges E and F into firm engagement with the bottom of the groove J; and second, to clench the tongues G so as to retain the members in this position. As the structure is so shaped as to possess a high degree of strength and rigidity the rolls when once properly alined will remain in this condition and will therefore operate satisfactorily when placed in the bearing.

What I claim as my invention is:

1. The method of assembling roller-holding cages, comprising the clamping of a series of individual roller holding cells with their axes in exactly predetermined relation to each other and rigidly connecting said cells while in that relation.

2. The method of assembling roller-holding cages, comprising the arrangement of a series of individual roller-holding cells in circular series, positioning said cells with their axes in exactly predetermined relation to each other, clamping said cells in that position, and rigidly connecting said cells while thus positioned.

3. The method of assembling roller-holding cages, comprising loosely assembling a circular series of individual roller-holding cells and a connector therefor, positioning and clamping said cells with their axes in exactly predetermined relation to each other, and rigidly securing said connector to said cells while thus positioned.

4. The method of assembling roller-holding cages, comprising the mounting of rolls in individual cells or housings, positioning and clamping said cells with their axes in exactly predetermined relation to each other, and rigidly securing a connector to said cells while thus positioned.

5. The method of assembling roller-holding cages, comprising the mounting of rolls in individual cells, loosely assembling a series of said cells with a connector, positioning and clamping said cells, with their axes in exactly predetermined relation to each other, and rigidly attaching said connector thereto while thus positioned.

6. The method of assembling roller-holding cages, comprising the mounting of a series of rollers in individual cells, assembling a series of said cells with a connector, accurately positioning the rollers and cells in relation to each other, and die-pressing the connector and cells while thus positioned to rigidly secure the same from displacement.

7. The method of assembling roller-holding cages, comprising the mounting of rollers in individual cells having projecting tongues at opposite ends thereof, assembling a series of said cells with connector rings, said tongue projecting through apertures in said rings, accurately alining and clamping the cells, die-pressing to clench the tongues, and rigidly securing the cells in such accurate alinement.

In testimony whereof I affix my signature.

JEREMIAH BINGHAM.